United States Patent [19]

Stoneham et al.

[11] Patent Number: 5,754,901
[45] Date of Patent: May 19, 1998

[54] APPARATUS TO ELIMINATE TRANSVERSE IN FILM

[75] Inventors: Jeffrey Richard Stoneham, Spencerport; David Clinton Smart, Rochester, both of N.Y.

[73] Assignee: Eastman Kodak Company, Rochester, N.Y.

[21] Appl. No.: 909,350

[22] Filed: Jul. 6, 1992

[51] Int. Cl.$^6$ .............................. G03B 17/04; G03B 17/24
[52] U.S. Cl. .................... 396/319; 396/320; 396/440; 396/535
[58] Field of Search .............................. 354/105, 106, 354/203; 396/310, 319, 320, 439, 440, 535

[56] References Cited

U.S. PATENT DOCUMENTS

| | | | |
|---|---|---|---|
| 3,902,797 | 9/1975 | Thomas | 352/29 |
| 4,132,473 | 1/1979 | Kondo | 354/203 |
| 4,678,305 | 7/1987 | Flitton | 354/203 |
| 4,685,790 | 8/1987 | Uematsu | 354/203 |
| 4,972,213 | 11/1990 | Stoneham et al. | 354/203 X |
| 4,992,812 | 2/1991 | Smart | 354/203 |
| 5,016,030 | 5/1991 | Dwyer et al. | 354/106 X |
| 5,028,940 | 7/1991 | Pearson | 354/105 X |
| 5,097,278 | 3/1992 | Tamamura et al. | 354/105 |
| 5,136,318 | 8/1992 | Aoshima | 354/105 |
| 5,155,511 | 10/1992 | Tamamura | 354/105 X |

*Primary Examiner*—Safet Metjahic
*Assistant Examiner*—J. K. Han
*Attorney, Agent, or Firm*—Gordon M. Stewart

[57] ABSTRACT

A magnetic reading and/or recording apparatus comprises a magnetic reading and/or recording head for reading and/or recording information from/on a magnetic information track on a photosensitive material having a natural longitudinal curl which when longitudinally straightened assumes an inherent transverse curl; and edge follower means attached to the magnetic reading and/or recording head for tracking a longitudinal edge of the photosensitive material in response to movement of the photosensitive material. Means are substantially aligned with the edge follower means for bending the photosensitive material in a direction perpendicular to the transverse curl to eliminate the transverse curl of the photosensitive material.

12 Claims, 3 Drawing Sheets

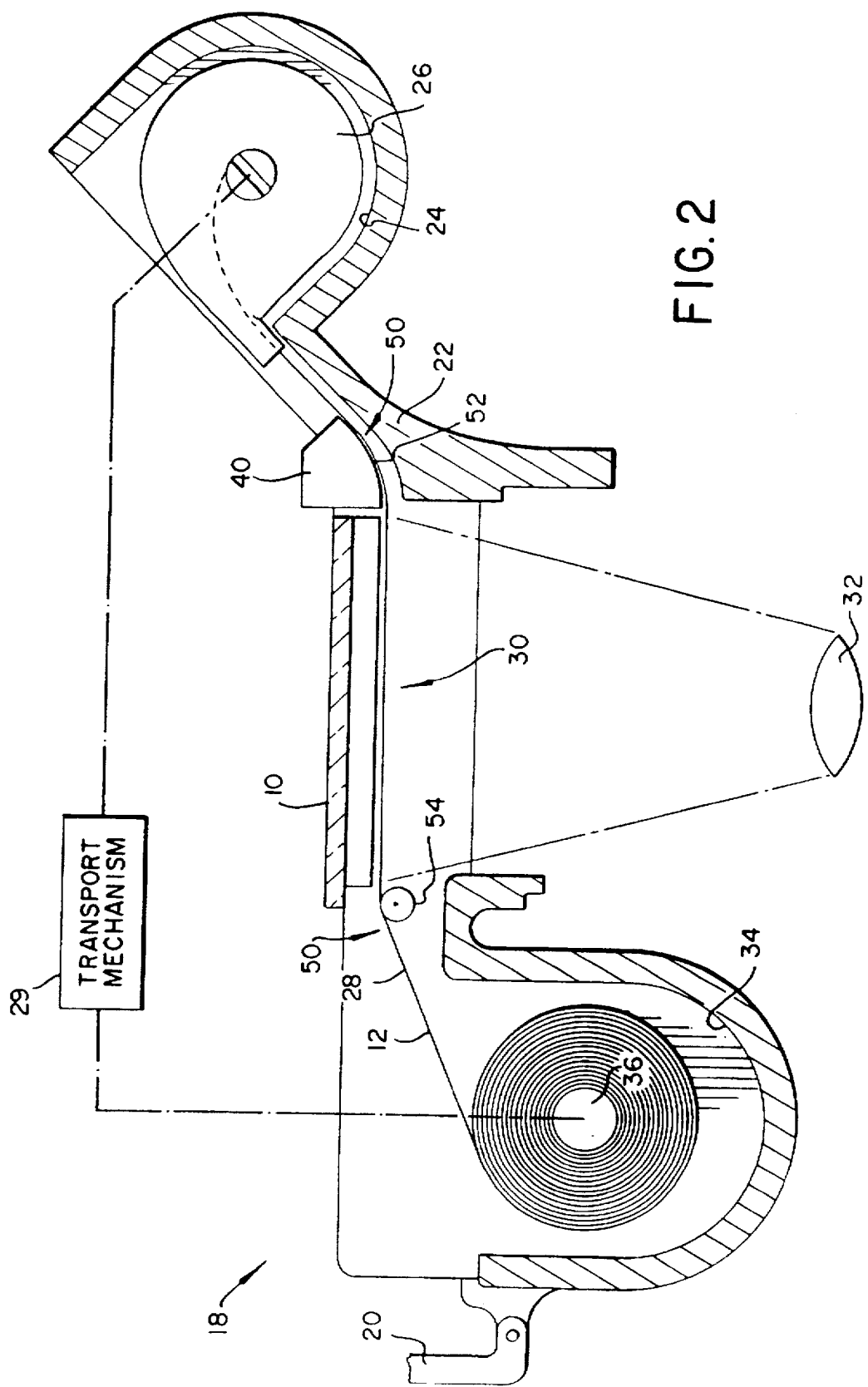

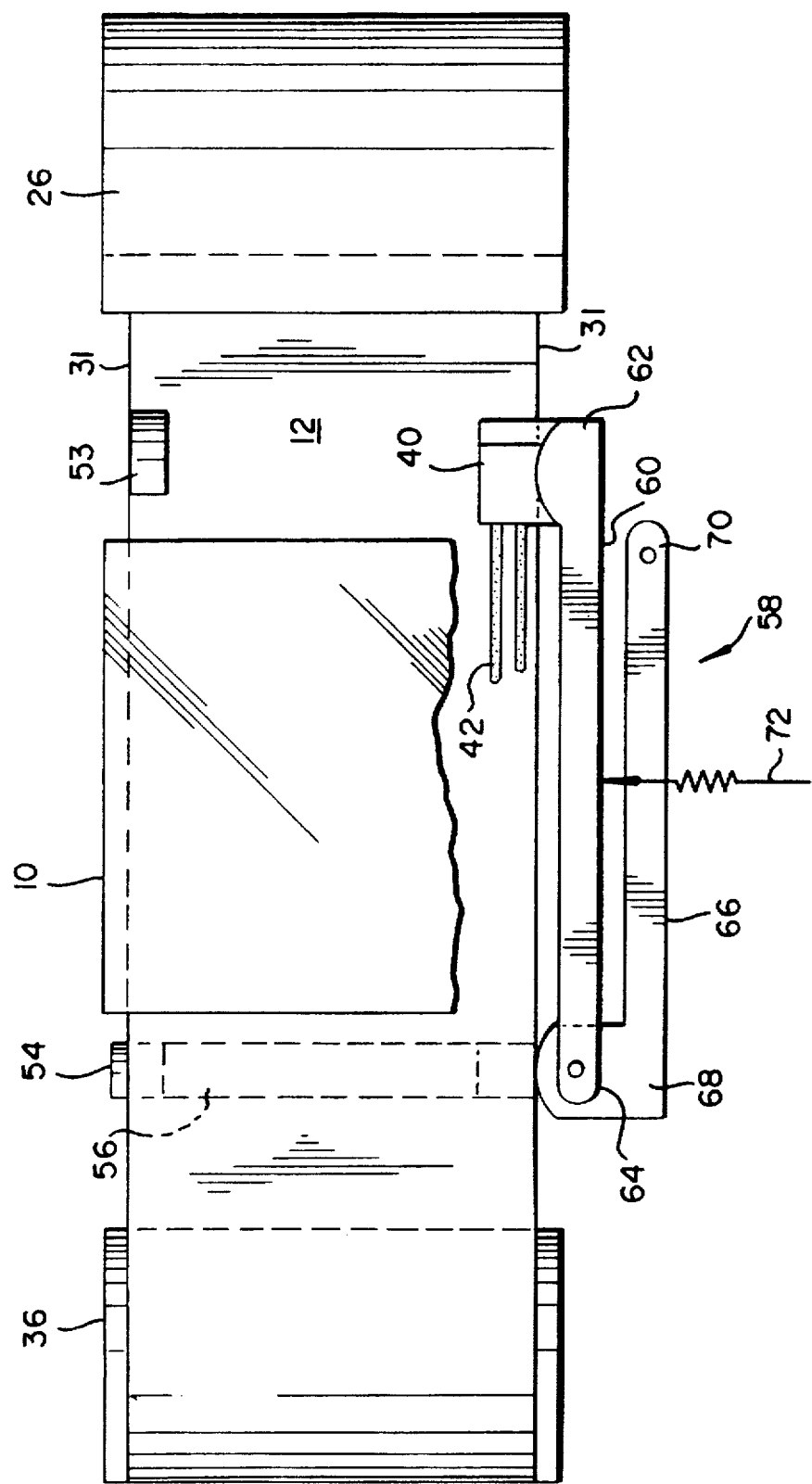

APPARATUS TO ELIMINATE TRANSVERSE IN FILM

FIELD OF THE INVENTION

This invention relates to magnetic reading and/or recording apparatus, and in particular to magnetic reading and/or recording apparatus for use in photographic equipment.

BACKGROUND OF THE INVENTION

Various patents disclose apparatus for supporting magnetic reading and/or recording heads for use in photographic equipment. For example, commonly assigned U.S. Pat. No. 4,972,213 and commonly assigned U.S. Pat. No. 5,016,030 each disclose a magnetic reading and/or recording head mounted on a film platen. The film platen is supported for limited movement to attempt to maintain a precise relationship between an information track on a photosensitive material and a longitudinal edge of the photosensitive material so that information can be accurately read and/or written from/on the information track.

Also, commonly assigned U.S. Pat. No. 5,028,940 discloses a magnetic reading and/or recording head mounted in a carriage mounted on a film platen which is movable in a direction perpendicular to the direction of travel of the photosensitive material. The carriage includes a pair of spring arms to bias the carriage towards the longitudinal edge of the photosensitive material so that a pair of pins extending from the carriage attempt to engage the edge of the photosensitive material in an effort to maintain a precise relationship between the edge of the photosensitive material and the information track so that information can be accurately read and/or written from/on the information track.

In general, photographic equipment will have a platen 10 or other device which urges the photosensitive material 12 toward rails 14 which engage opposite longitudinal edges of the photosensitive material as shown in FIG. 1. The platen 10 will tend to remove longitudinal curl resulting from photosensitive core set in a cartridge and only some of the transverse curl across the photosensitive material. However, since the photosensitive material is unsupported transversely, some of the transverse curl still exists as indicated in FIG. 1 at areas 16.

PROBLEM TO BE SOLVED BY THE INVENTION

This transverse curl can prevent edge following devices such as the platen disclosed in U.S. Pat. No. 4,972,213 and U.S. Pat. No. 5,016,030 or the pair of pins disclosed in U.S. Pat. No. 5,028,940 from accurately engaging the edge of the photosensitive material, thus a precise relationship between the edge of the photosensitive material and the information track may not be achieved and there may be a decrease in the amount of information read and/or recorded on the information track.

SUMMARY OF THE INVENTION

The present invention is directed to a magnetic reading and/or recording apparatus comprising a magnetic reading and/or recording head for reading and/or recording information from/on a magnetic information track on a strip of photosensitive material having a natural longitudinal curl which when longitudinally straightened assumes an inherent transverse curl; and edge follower means attached to the magnetic reading and/or recording head for tracking a longitudinal edge of the photosensitive material in response to movement of the photosensitive material. Means are substantially aligned with the edge follower means for bending the photosensitive material widthwise to eliminate the transverse curl of the photosensitive material.

The magnetic reading and/or recording apparatus embodying the present invention provides a stiff edge for the edge follower means to track so that the magnetic reading and/or recording head will be accurately positioned to read and/or record the maximum amount of magnetic information from/on the information track on the photosensitive material.

Another aspect of the invention is an apparatus for supporting a magnetic reading and/or recording head for reading and/or recording information from/on an information track on a photosensitive material; comprising a frame; a first edge follower support arm having opposite end portions, one of said edge portions being attached to said magnetic reading and/or recording head; a second edge follower support arm having opposite end portions; means for connecting one of said opposite end portions of said second edge follower support arm to said frame for pivotal movement relative to said frame to allow its other end portion to follow a longitudinal edge of the photosensitive material; means for connecting one of said opposite end portions of said first edge follower support arm to said other end portion of said second edge follower support arm for pivotal movement relative to said second edge follower support arm to allow its other end portion having the magnetic reading and/or recording head attached thereto to follow a longitudinal edge of the photosensitive material; and means located intermediate said opposite end portions of said first edge follower support arm for biasing said first edge follower support arm towards a longitudinal edge of the photosensitive material.

Another aspect of the invention is a magnetic reading and/or recording apparatus for reading and/or recording information from/on and information track on a photosensitive material having a natural longitudinal curl which when longitudinally straightened assumes an inherent transverse curl; comprising a frame; a magnetic reading and/or recording head; a first edge follower support arm having a first end portion attached to said magnetic reading and/or recording head and a second end portion; a second edge follower support arm having first and second end portions; means for connecting said first end portion of said second edge follower support arm to said frame for pivotal movement relative to said frame to allow said second end portion of said second edge follower support arm to follow a longitudinal edge of the photosensitive material; means for connecting said second end portion of said first edge follower support arm to said second end portion of said second edge follower support arm for pivotal movement relative to said second edge follower support arm to allow said first end portion of said first edge follower support arm to follow a longitudinal edge of the photosensitive material; means located intermediate said first and second end portions of said first edge follower support arm for biasing said first edge follower support arm towards a longitudinal edge of the photosensitive material; means substantially aligned with said first end portion of said first edge follower support arm for bending the photosensitive material in a direction perpendicular to the transverse curl to eliminate the transverse curl; and means substantially aligned with said second end portion of said second edge follower support arm for bending the photosensitive material in a direction perpendicular to the transverse curl to eliminate the transverse curl.

BRIEF DESCRIPTION OF DRAWINGS

Other advantages of the invention will become apparent from the following description taken in connection with the accompanying drawing wherein:

FIG. 2 is a cross section of a portion of a photographic camera illustrating a portion of a magnetic reading and/or recording apparatus in accordance with the invention;

FIG. 3 is a plan view of a photographic camera illustrating the magnetic reading and/or recording apparatus.

DETAILED DESCRIPTION OF THE INVENTION

Figure 1:
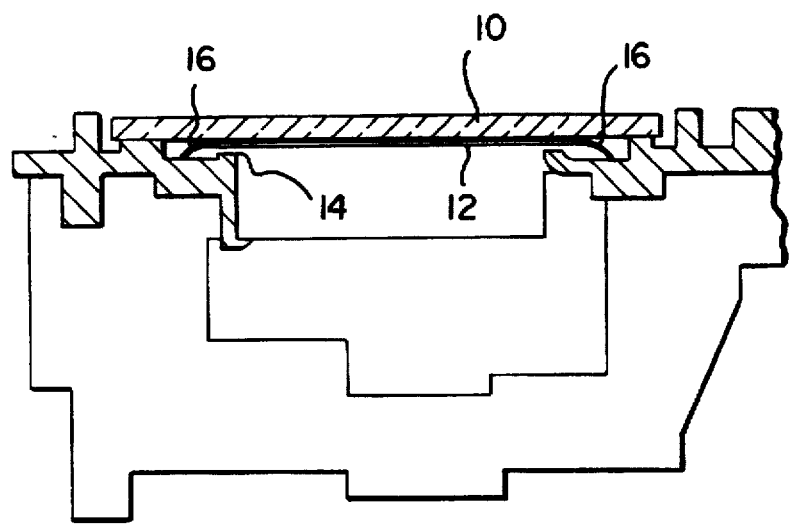
FIG. 1 is a cross section illustrating how a platen engages a photosensitive material.

The invention is disclosed as being embodied preferably in a photographic still camera, but could be used in any photographic equipment. Because such a camera is well known, this description is directed in particular to photographic elements forming part of or cooperating directly with the disclosed embodiment. It is to be understood, however, that other elements not specifically shown or described may take various forms known to persons of ordinary skill in the art.

Referring to FIGS. 2 and 3 of the drawings, there is shown a portion of a typical photographic still camera 18 having a rear door 20 pivotal between an open and closed position. The camera 18 includes a housing or frame 22 having a chamber 24 at one end thereof for receiving a film cartridge 26 containing a photosensitive material 12.

The photosensitive material 12 is provided with a transparent magnetic coating 28 on its non-emulsion side. The film cartridge 26 is fixedly held in the chamber 24 when the rear door 20 is in the closed position.

The photosensitive material 12 is transported by a transport mechanism 29 from the film cartridge 26 across an exposure opening 30 aligned with a taking lens 32 to a take-up chamber 34 where it is wound on a take-up spool 36. Typically, transport mechanisms operate to move the film frame by frame either from the cartridge to the take-up spool or from the take-up spool to the film cartridge.

It is well known that the photosensitive material 12 will tend to get a longitudinal curl resulting from a core set when stored in the film cartridge 26 for a period of time. The photosensitive material 12 assumes an inherent transverse curl when longitudinal curl is removed by longitudinally straightening the photosensitive material 12. The photosensitive material 12 is longitudinally straightened as it is moved between the take-up spool 36 and the film cartridge 26. A platen 10 having planar dimensions complemental to the exposure opening 30 engages the longitudinal edges 31 of the photosensitive material and urges it towards a pair of rails 14 formed on opposite sides of the exposure opening 30 when the rear door 20 is in the closed position. The platen 10 will tend to remove the longitudinal curl of the photosensitive material 12. The platen 10 will tend to remove some of the inherent transverse curl as well. However, since the photosensitive material 12 is unsupported across a width of the photosensitive material 12 some transverse curl still exists as indicated at area 16 in FIG. 1. Also, the transverse curl can still exist due to a build up of tolerances between the platen, the rails and other related parts of the camera along with variabilities of the longitudinal edges of the photosensitive material 12.

The camera 18 includes a magnetic reading and/or recording apparatus having a magnetic reading and/or recording head 40 for reading and/or recording information from/on a magnetic information track 42 on the photosensitive material 12. Edge follower means 44 including a first edge follower 46 and a second edge follower 48 located at opposite sides of the exposure opening 30 for tracking the longitudinal edge 31 of the photosensitive material 12 in response to movement of the photosensitive material 12 are aligned with bending means 50. The bending means 50 will curve the photosensitive material 12 perpendicular to the transverse curl to eliminate the transverse curl.

Bending the photosensitive material 12 will eliminate the transverse curl of the photosensitive material 12, and provide a stiff edge for the edge followers 46,48 to track the longitudinal edge 31. It is preferable to bend the photosensitive material 12 in a direction opposite to the natural longitudinal curl. In the preferred embodiment, a recording surface 52 of the magnetic reading and/or recording apparatus has a predetermined radius to bend the photosensitive material 12 at one longitudinal edge 31 of the photosensitive material in the direction reverse to its natural longitudinal curl. A roller 53 is located at the opposite longitudinal edge 31. The radius of the recording surface 52 and the roller 53 need only be sufficient to remove the transverse curl of the photosensitive material 12. The radius of the recording surface 52 should also be sufficient to provide a contact surface greater than a head gap width.

Bending the photosensitive material 12 in the direction of its natural curl is a viable alternative. In the preferred embodiment, the photosensitive material 12 is bent in the direction of its natural longitudinal curl by wrapping the photosensitive material over a roller 54 aligned with the second edge follower 48. The roller 54 includes a recess 56 having dimensions complemental to the exposure opening 30 so that an image area on the photosensitive material 12 does not get damaged as it is transported over the roller 54. The photosensitive material 12 could also be bent by a pair of rollers located at opposite longitudinal edges of the photosensitive material or by an edge of the housing 22. Slight pressure by the magnetic reading and/or recording head 40 will also bend the photosensitive material 12 in the direction of its natural longitudinal curl.

Figure 4:
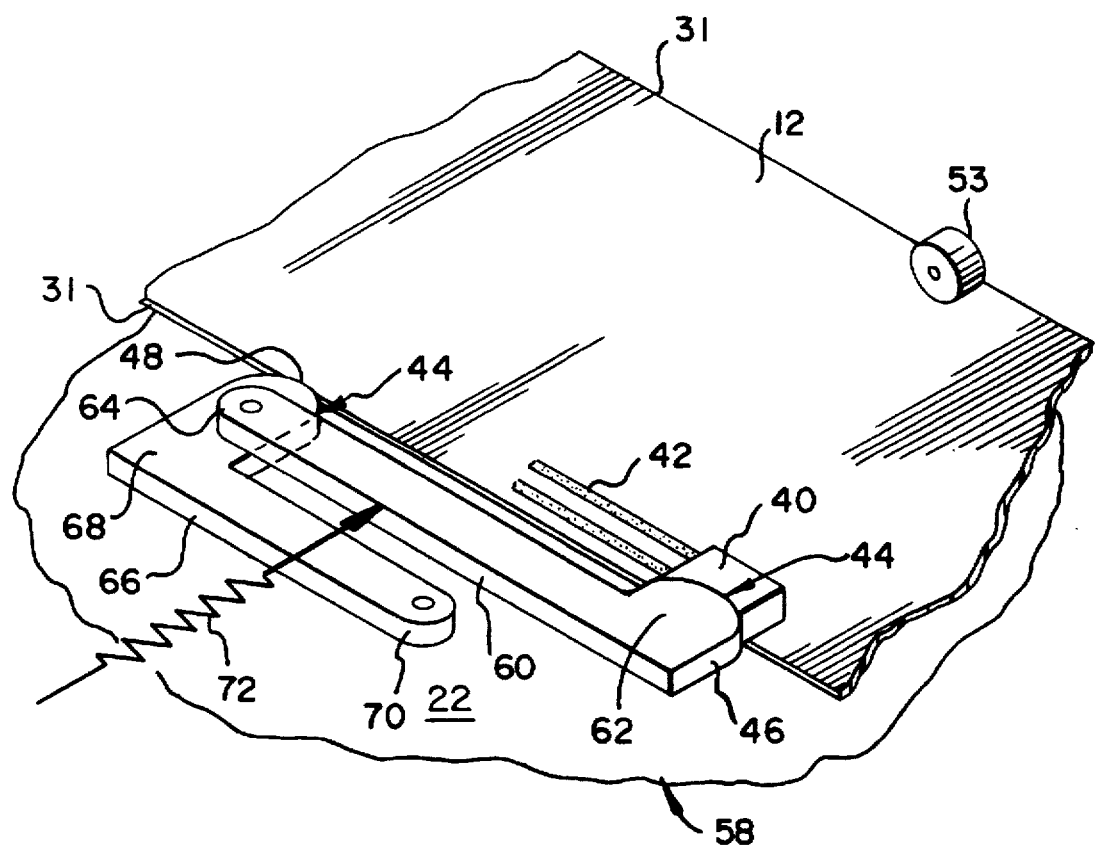
FIG. 4 is a perspective view of the magnetic reading and/or recording apparatus.

Bending the photosensitive material 12 provides a stiff edge to permit a supporting means 58, illustrated in FIGS. 3 and 4, to accurately and reliably position the magnetic reading and/or recording head 40 in relation to the longitudinal edge of the photosensitive material 12. The supporting means 58, attached to the edge follower means 44, also will position the magnetic reading and/or recording head 40 so as to maintain the head gap substantially perpendicular to a longitudinal axis of the photosensitive material 12 regardless of variations in the longitudinal edge 31 of the photosensitive material 12. Accurately and reliably positioning the magnetic reading and/or recording head 40 will permit the magnetic reading and/or recording head 40 to read and/or record a maximum amount of magnetic information from/on the information track 42.

The supporting means 58 includes a first support arm 60 having a first end 62 attached to the first edge follower 46 so that the recording surface 52 of the magnetic reading and/or recording head 40 is parallel to the tangent line formed by the bending the photosensitive material 12 by the recording surface 52. A second end 64 of the first support arm 60 is pivotally attached to the second edge follower 48 which is located perpendicular and adjacent to the tangential point formed by the bending of the photosensitive material 12 by the roller 54. A second support arm 66 has a first end 68 attached to the second edge follower 48 and a second end 70 pivotally attached to the housing 22 or the platen 10.

Maximizing the distance between the first edge follower 46 and the second end 64 of the first support arm 60 will minimize the effect any variations in the longitudinal edge 31 of the photosensitive material 12 will have on the geometric positioning of the magnetic reading and/or recording head 40 as the photosensitive material 12 is transported under the magnetic reading and/or recording head 40. Maximizing the distance between the second edge follower 48 and the second end 70 of the second support arm 66 will minimize the effect any variations in the longitudinal edge 31 of the photosensitive material 12 will have on the longitudinal positioning of the magnetic reading and/or recording head 40 as the photosensitive material 12 is transported under the magnetic reading and/or recording head 40.

The supporting means 58 further includes a spring 72 located between the first and second edge followers 46 and 48 which applies a force to the first support arm 60 to bias the first and second edge followers 46,48 towards the longitudinal edge 31 of the photosensitive material 12. The force the spring 72 applies to the first support arm 60 needs only to be sufficient to overcome friction at the pivot points of the first and second support arms 60 and 66.

In operation, the first and second edge followers 46 and 48 will engage the longitudinal edge 31 of the photosensitive material 12 under the bias of spring 72 as the photosensitive material is transported under the magnetic reading and/or recording head 40. The head gap of the magnetic reading and/or recording head 40 will remain substantially perpendicular to the longitudinal axis of the photosensitive material 12 regardless of variations in the longitudinal edge 31 of the photosensitive material 12.

A magnetic reading and/or recording apparatus which accurately and reliably causes a magnetic reading and/or recording head to read and/or record a maximum amount of information from/on an information track on a photosensitive material has been described. This will offer the advantage of producing standardized reading and/or recording of magnetic information from camera to camera and from camera to other photographic equipment.

The present invention has been described in detail with particular reference to a preferred embodiment thereof, but it will be understood that variations and modifications can be effected within the spirit and scope of the invention.

We claim:

1. A magnetic reading and/or recording apparatus comprising a magnetic reading and/or recording head for reading and/or recording information from/on a magnetic information track on photosensitive material having a natural longitudinal curl which when longitudinally straightened assumes an inherent transverse curl; and edge follower means attached to said magnetic reading and/or recording head for tracking a longitudinal edge of the photosensitive material in response to movement of the photosensitive material; is characterized in that:

means are aligned with said edge follower means for bending the photosensitive material perpendicular to the transverse curl to eliminate the transverse curl of the photosensitive material.

2. A magnetic reading and/or recording apparatus as defined in claim 1, wherein said bending means includes means for curving the photosensitive material in the direction of the natural longitudinal curl of the photosensitive material.

3. A magnetic reading and/or recording apparatus as defined in claim 2, wherein said curving means includes a roller.

4. A magnetic reading and/or recording apparatus as defined in claim 1, wherein said bending means includes means for curving the photosensitive material in a direction reverse to the natural longitudinal curl of the photosensitive material.

5. A magnetic reading and/or recording apparatus as defined in claim 4, wherein said curving means includes a roller.

6. A magnetic reading and/or recording apparatus as defined in claim 4, wherein said curving means includes the magnetic reading and/or recording head having a curved surface engageable with the photosensitive material.

7. A magnetic reading and/or recording apparatus as defined in claim 1, further includes:

means attached to said edge follower means for supporting the magnetic reading and/or recording head to maintain a gap of the magnetic reading and/or recording head substantially perpendicular to a longitudinal axis of the photosensitive material regardless of variations in the longitudinal edge of the photosensitive material.

8. A magnetic reading and/or recording apparatus as defined in claim 7, further comprising a housing having an exposure opening, and wherein said edge follower means is located at one side of said exposure opening and said supporting means includes a support arm having a first end attached to said edge follower means and having a second end pivotally attached to said housing at an opposite side of said exposure opening.

9. A magnetic reading and/or recording apparatus as defined in claim 8, wherein said supporting means further includes means for biasing said edge follower means towards the longitudinal edge of the photosensitive material.

10. A magnetic reading and/or recording apparatus as defined in claim 7; further including a housing having an exposure opening; and wherein said edge follower means includes a first edge follower attached to said magnetic reading and/or recording head and a second edge follower located on opposite sides of said exposure opening, said supporting means includes a first support arm having one end attached to said first edge follower and a second end pivotally supported on said second edge follower; and a second support arm having one end attached to said second edge follower and a second end pivotally supported on said housing.

11. An apparatus for supporting a magnetic reading and/or recording head for reading and/or recording information from/on an information track on a photosensitive material; comprising:

a frame;

a first edge follower support arm having opposite end portions, one of said end portions being attached to said magnetic reading and/or recording head;

a second edge follower support arm having opposite end portions;

means for connecting one of said opposite end portions of said second edge follower support arm to said frame for pivotal movement relative to said frame to allow its other end portion to follow a longitudinal edge of the photosensitive material;

means for connecting one of said opposite end portions of said first edge follower support arm to said other end portion of said second edge follower support arm for pivotal movement relative to said second edge follower support arm to allow its other end portion having the magnetic reading and/or recording head attached thereto to follow a longitudinal edge of the photosensitive material; and means located intermediate said opposite end portions of said first edge follower support arm for biasing said first edge follower support arm towards a longitudinal edge of the photosensitive material.

12. A magnetic reading and/or recording apparatus for reading and/or recording information from/on or information track on a photosensitive material having a natural longitudinal curl which when longitudinally straightened assumes an inherent transverse curl; comprising:

a frame;

a magnetic reading and/or recording head;

a first edge follower support arm having a first end portion attached to said magnetic reading and/or recording head and a second end portion;

a second edge follower support arm having first and second end portions;

means for connecting said first end portion of said second edge follower support arm to said frame for pivotal movement relative to said frame to allow said second end portion of said second edge follower support arm to follow a longitudinal edge of the photosensitive material;

means for connecting said second end portion of said first edge follower support arm to said second end portion of said second edge follower support arm for pivotal movement relative to said second edge follower support arm to allow said first end portion of said first edge follower support arm to follow a longitudinal edge of the photosensitive material;

means located intermediate said first and second end portions of said first edge follower support arm for biasing said first edge follower support arm towards a longitudinal edge of the photosensitive material;

means substantially aligned with said first end portion of said first edge follower support arm for bending the photosensitive material in a direction perpendicular to the transverse curl to eliminate the transverse curl; and means substantially aligned with said second end portion of said second edge follower support arm for bending the photosensitive material in a direction perpendicular to the transverse curl to eliminate the transverse curl.

* * * * *